United States Patent [19]
Amagami et al.

[11] 3,783,904
[45] Jan. 8, 1974

[54] FLUID AMPLIFIER

[75] Inventors: Keizo Amagami, Neyagawa; Masaru Nishijyo, Yamatokoriyama; Yutaka Takahashi; Motoyuki Nawa, both of Nara, all of Japan

[73] Assignee: Matsushita Electric Industrial Co., Ltd., Osaka, Japan

[22] Filed: Aug. 1, 1972

[21] Appl. No.: 277,132

[52] U.S. Cl. .................................. 137/811, 137/809
[51] Int. Cl. .................................................. F15c 1/16
[58] Field of Search .......................... 137/803–842

[56] References Cited

UNITED STATES PATENTS

| | | | |
|---|---|---|---|
| 3,285,265 | 11/1966 | Boothe et al. | 137/841 X |
| 3,626,965 | 12/1971 | Healey | 137/841 X |
| 3,670,753 | 6/1972 | Healey | 137/823 |
| 3,543,780 | 12/1970 | Ahern | 137/840 X |
| 3,550,607 | 12/1970 | Sarpkaya | 137/840 X |
| 3,568,700 | 3/1971 | Verhelst et al. | 137/840 X |

*Primary Examiner*—Samuel Scott
*Attorney*—Stevens, Davis, Miller, & Mosher

[57] ABSTRACT

A pure fluid amplifier with a high output power and a high switching gain is provided in which vortexes are generated in an interaction region so that the high output power may be obtained even when the output load is increased.

10 Claims, 6 Drawing Figures

FLUID AMPLIFIER

The present invention relates to a pure fluid amplifier and more particularly a monostable and a bistable fluid amplifier.

In a fluid operating system, especially in a closed loop circuit, the advantage of a fluid amplifier which is used as a divider valve is not expected because of the various defects of the prior art pure fluid amplifiers. A first defect is that the fluid amplifier is not stable in operation and the memory function is also not reliable because the output load of the fluid amplifier is normally greater in practice. A second defect is the reduction in effective output power caused when the position of a fluid flow divider means is further shifted to the down stream in order to attain the reliable memory function. To overcome this defect, there has been proposed the use of vent means, but the decrease in effective output power cannot be avoided and the fluid circuit becomes complex in design. A third defect is the remarkable decrease in switching gain caused when the boundary layer lock-on phenomena is increased in order to attain the reliable memory function and the high effective output power.

One of the objects of the present invention is therefore to provide a pure fluid amplifier which is stable in operation and reliable in memory function even when the output load of the pure amplifier in a closed loop circuit is increased.

Another object of the present invention is to provide a pure fluid amplifier in which may be obtained the high effective output power over a wide range.

Another object of the present invention is to provide a pure fluid amplifier in which may be obtained the high output power and a high switching gain as well.

The above and other objects, features and advantages of the present invention will become more apparent from the following description of preferred embodiments thereof taken in conjunction with the accompanying drawing.

Figure 1:
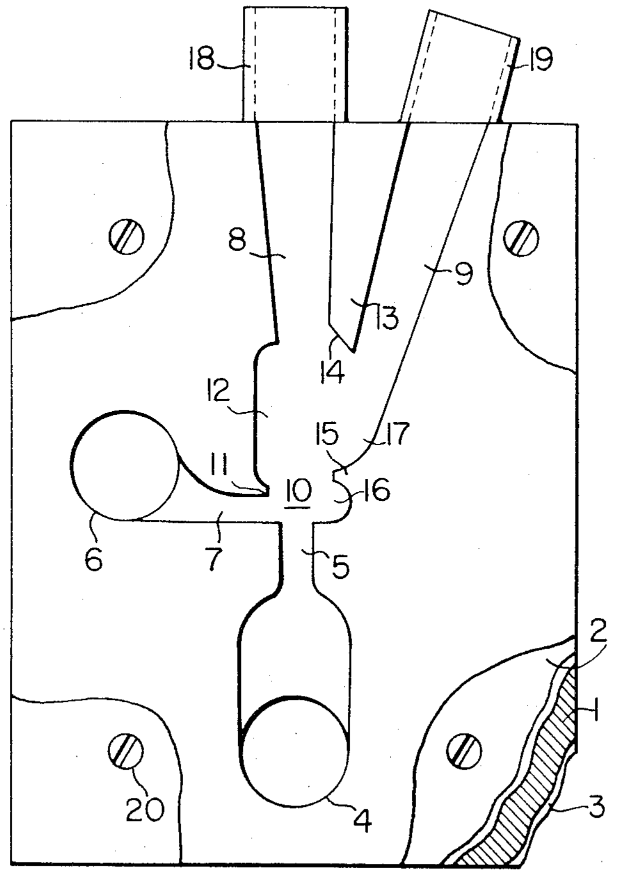
Figure 1:
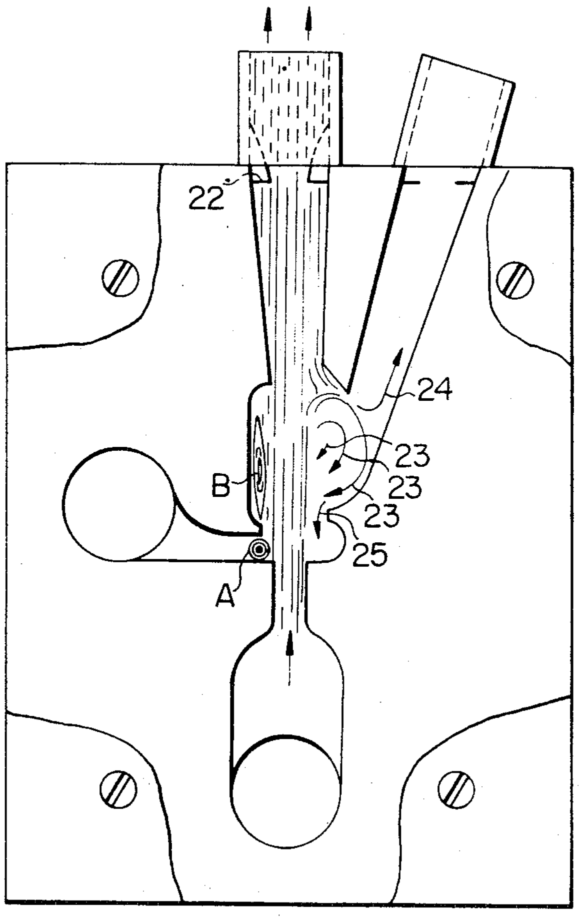
Figure 1:
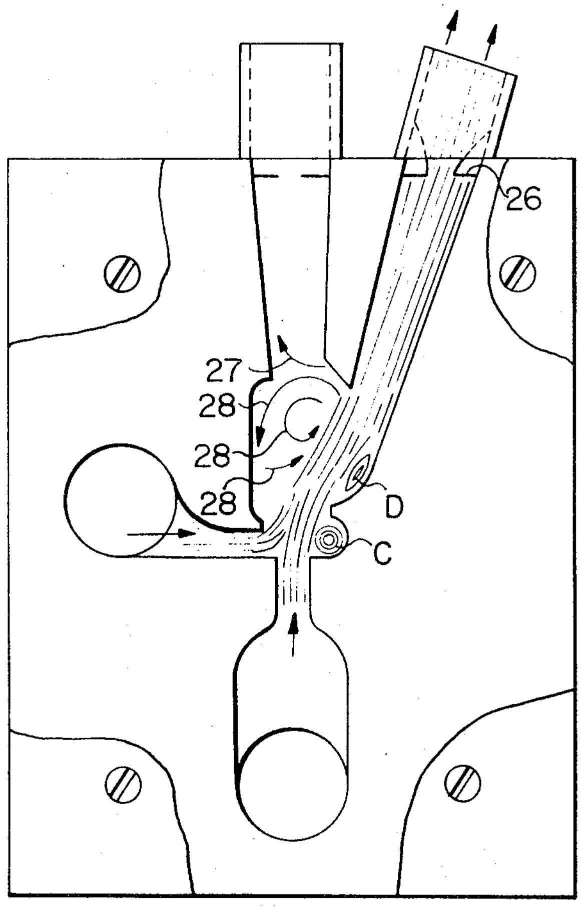
Figure 2:
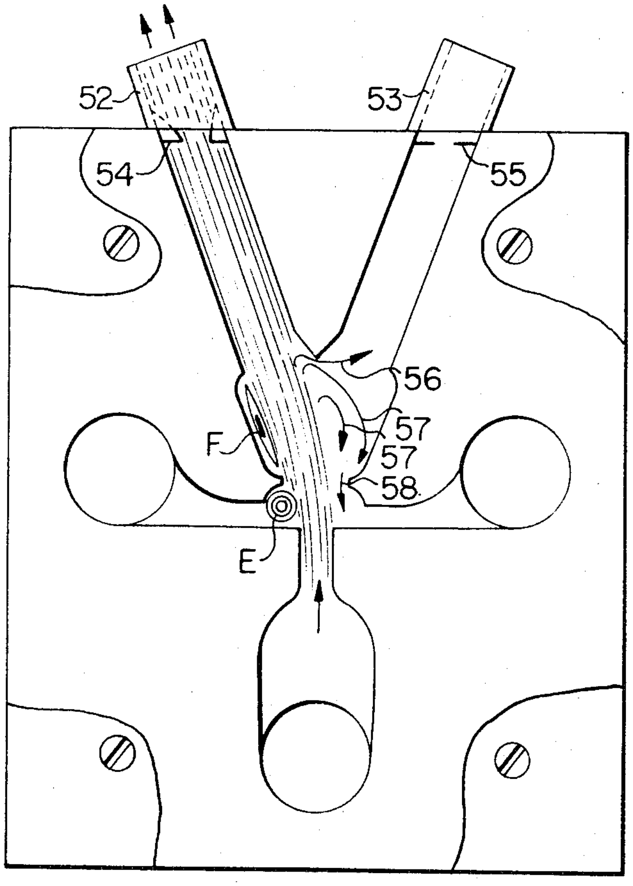
Figure 2:
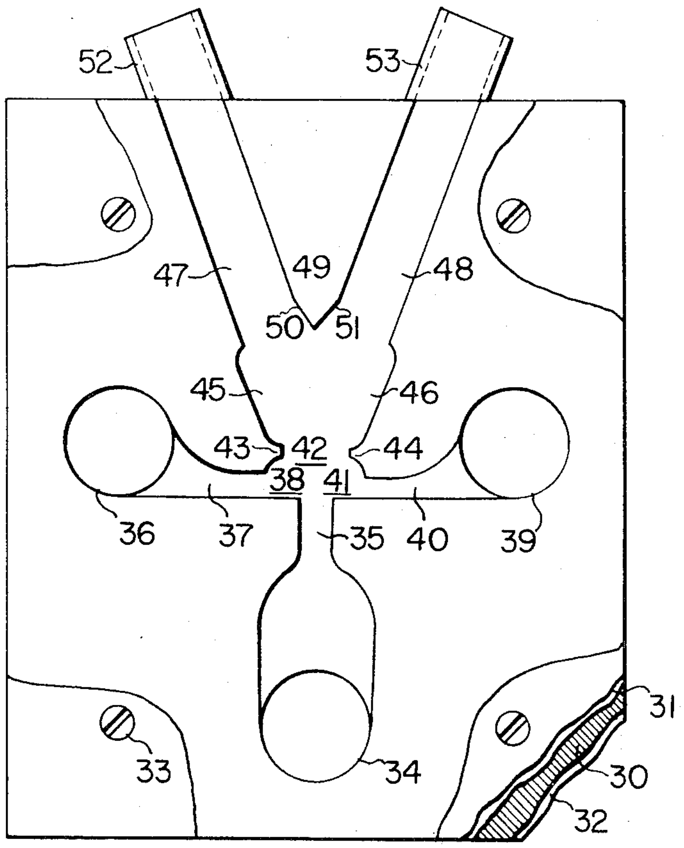
Figure 2:
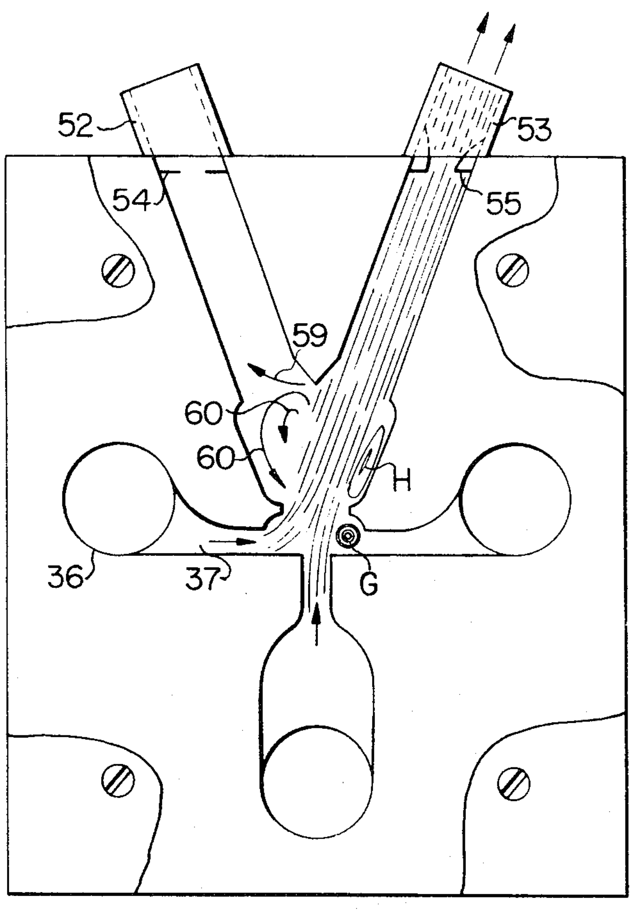

FIG. 1 is a schematic top view of a monostable fluid amplifier in accordance with the present invention;

FIGS. 1(*a*) and 1(*b*) illustrate the fluid flow patterns used for explanation of the mode of operation thereof;

FIG. 2 is a schematic top view of a bistable fluid amplifier in accordance with the present invention; and FIGS. 2(*a*) and 2(*b*) illustrate the fluid flow patterns used for explanation of the mode of operation thereof.

A monostable fluid amplifier illustrated in FIG. 1 generally comprises a base member 1 having a fluid circuit formed therein and an upper and a lower covers 2 and 3 fluid-tightly secured to the member 1 by screws 20 or other suitable means. The lower cover 3 is provided with a fluid supply port 4 and a control fluid supply port 6. The fluid supply port 4 is communicated with a power nozzle 5 through which issues the power stream, and the control flow supply port 6 is communicated with a control nozzle 7 through which issues the control flow into an interaction region 10. The intersection region 10 is communicated with a pair of output passages 8 and 9 which in turn are communicated with outlets 18 and 19, respectively. The pair of output passages 8 and 9 are divded by a splitter or divider 13 having a tapered surface 14 formed at the leading edge. The side wall of the interaction region 10 on which the control nozzle 7 opens is provided with a first vortex chamber 12 which is spaced apart from the control nozzle 7 by a first projection 11. In the other side wall opposite to the control nozzle 7 is formed a second projection 15 which defines with the side wall a second vortex chamber 16 and a third vortex chamber 17.

Next the mode of operation of the monostable fluid amplifier with the above construction will be described hereinafter with reference to FIGS. 1(*a*) and 1(*b*). The fluid supplied through the port 4 is accelerated through the power nozzle 5 and issues into the interaction region 10. When no control flow is issuing from the control nozzle 7, the power stream issuing from the power nozzle 5 is directed to flow through one output passage 8 and is discharged through the outlet 18. In this case, the fluid flow pattern is shown in FIG. 1(*a*). Vortexes or low pressure separation bubbles A and B are produced in the area of the control nozzle 7 and the first vortex chamber 12 so that the power stream is positively directed toward the one passage 8 under the vortex action or boundary layer lock-on phenomena. As the output load of the one output passage 8, which is shown as a resistance 22 in FIG. 1(*a*), is increased, the leakage flow 24, that is the fluid flow deviated to flow into the other output passage 9, is increased. In the prior art fluid amplifiers, such leakage flow 24 has no special operation at all, and the back pressure caused in the one output passage 8 tends to destroy the vortexes A and B whereas a new vortex is produced in the second vortex chamber 16. As a result, the power stream tends to be directed toward the other output passage 9 so that the effective output power produced in the one output passage 8 is reduced to a great extent. However, according to the present invention, the tapered surface 14 is formed at the leading edge of the splitter 13 so that a part of the leakage flow 24 flows along the side wall of the third vortex chamber 17 as indicated by the arrows 23 in FIG. 1(*a*) and is so directed by the second projection 15 as to collide with the power stream and further a part 25 of the flow 23 flows past the second projection 15 into the second vortex chamber 16 so that the undesired generation of vortex in the second vortex chamber may be prevented.

Therefore, the power stream is forced to direct toward the one output passage 8 even when the resistance 22 is increased so that the high effective output power may be obtained. In practice, the effective output power of the order of about 1.6 times may be obtained.

Next referring to the fluid pattern illustrated in FIG. 1(*b*), the mode of operation of the monostable fluid amplifier will be described when the control flow issues from the control nozzle 7. When the control flow issues from the control nozzle 7, the vortex A in the area of the control nozzle 7 vanishes so that the boundary layer lock-on phenomena of the power stream to the one output passage 8 is reduced. At the same time a vortex C is generated in the second vortex chamber 16 so that the power stream is directed toward the other output passage 9 under the action of the vortex C. In this case, the vortex B in the first vortex chamber 12 vanishes so that the lock-on phenomena of the power stream toward the one output passage 8 is completely vanished. At the same time the vortex D is generated in the third vortex chamber 17 so that the power stream is positively held to flow toward the other output passage 9 due to the lock-on phenomena by the vortexes C and D.

As the output load of the other output passage 9, which is shown as a resistance 26 in FIG. 1(*b*), is increased, the leakage flow 27 toward the one output passage 8 is increased. A part of this leakage flow 27 flows along the side wall of the first vortex chamber 12 as indicated by the arrows 28 in FIG. 1(*b*) and is so directed as to collide with the power stream so that the power stream is forced to direct toward the other output passage 9. Thus, the high effective output power may be obtained in the output passage 9. It is clear that the monostable fluid amplifier of the present invention has a high switching gain because only the control flow at such a flow rate as to vanish the vortex A in the area of the control nozzle 7 is needed to switch the fluid flow.

When the supply of the control flow is interrupted, the vortexes C and D are vanished by the power stream issuing through the power nozzle 5 so that the power stream is re-directed to flow through the one output passage 8 as shown in FIG. 1(*a*).

Next referring to FIG. 2, one embodiment of a bistable fluid amplifier in accordance with the present invention will be described in detail hereinafter. The bistable fluid amplifier illustrated in FIG. 2 generally comprises a base member 30 and an upper and a lower covers 31 and 32 which are fluid-tightly second to the member 30 with screws 33 or other suitable means. The member 30 has a fluid circuit formed therein, and the lower cover 32 is provided with a fluid supply port 34 and a pair of control fluid supply ports 36 and 39. The fluid supply port 34 is communicated with a power nozzle 35, whereas the pair of control fluid flow supply ports are communicated with control nozzles 37 and 40, respectively. The power nozzle 35 and the pair of control nozzles 37 and 40 open to an interaction region 42 from which a pair of output passage 47 and 48 communicated with outlets 52 and 53, respectively extend. The pair of output passages 47 and 48 are divided by a splitter 49 having a wedge-shaped edge or a pair of tapered surfaces 50 and 51. The pair of control nozzles 37 and 40 are enlarged at their ends opening to the interaction region 42 to form a pair of first vortex chambers 38 and 41. Along a pair of side walls of the interaction region 42 in the downstream of the pair of first vortex chambers 38 and 41 are formed a pair of second vortex chambers 45 and 46 which are separated apart from the pair of first vortex chambers by a pair of projection 43 and 44, respectively.

Next the mode of operation of the bistable fluid amplifier with the above construction will be described with reference to FIGS. 2(*a*) and 2(*b*). It is assumed that the power stream issuing from the power nozzle 35 be so initially directed as to flow through one of the pair of output passages 47 as shown in FIG. 2(*a*). The power stream is accelerated as it flows through the power nozzle 35 from the port 34 and issues into the interaction region 42. Vortexes E and F are generated in the first and second vortex chambers 38 and 45 respectively due to the entrainment of the power stream so that the power stream is forced to direct toward the one output passage 47 under the action of vortexes E and F. When the output load of the one output passage, which is shown as a resistance 54 in FIG. 2(*a*), is increased, the leakage flow 56 from the one output passage 47 to the other output passage 48 is increased. In the prior art bistable fluid amplifiers, this leakage flow 56 has not been operated at all, and the vortexes E and F are destroyed or vanished by the back pressure generated in the one output passage 47 or an undesired vortex is generated in the first vortex chamber 58 so that the effective output power in the one output passage 47 is decreased. However according to the present invention, a part of the leakage flow 56 is directed toward the upper stream by the tapered surface 50 of the splitter 49 on the side of the one output passage 47, and a part of the leakage flow 56 is caused to flow along the side wall of the second vortex chamber 46 as indicated by the arrows 57 in FIG. 2(*a*). The flow 57 is so re-directed by the projection 44 as to colide with the power stream to force the power stream toward the one output passage 47, and a part of the flow 57 is caused to flow into the first vortex chamber 41 as indicated by the arrow 58 so that the generation of the undersired vortex in the first chamber 41 may be prevented. Thus, even when the output load of the one output passage 47 is increased, the fluid amplifier exhibits the stabilized characteristics and the high effective output power is obtained in the one output passage 47.

Next referring to FIG. 2(*b*), when the control flow issues from the control nozzle 37, it vanishes the vortex E (See FIG. 2(*a*)) so that the lock-on phenomena of the power stream toward the one output passage 47 is reduced. Then a vortex G is generated in the first vortex chamber 41 so that the power stream is directed toward the other output passage 48 under the action of the vortex G. In this case, the vortex F in the second vortex chamber 45 is vanished whereas a vortex H is generated in the second vortex chamber 46 so that the power stream is further deflected toward the other output passage 48 under the action of vortex H. When the output load on the side of the other output passage 48, which is shown as a resistance 55 in FIG. 2(*b*), is increased, the leakage flow 59 into the one output passage 47 and a part of the leakage flow 59 are caused to flow in a manner substantially similar to that described with reference to FIG. 2(*a*). Thus, the high effective output power may be obtained in the other output passage 48. When the control flow through the control nozzle 37 is interrupted, the power stream issuing from the power nozzle 35 is held to flow through the other output passage 48, unless the control flow issues from the other control nozzle 40. Thus, the bistable operation is effected.

Since the power stream may be switched only by the control flow with such a flow rate as to vanish the vortex E in FIG. 2(*a*), the high switching gain may be obtained.

What is claimed is:

1. A pure fluid amplifier comprising main nozzle means for issuing a power stream, at least one control nozzle disposed in the down stream of said main nozzle means for transversely producing the pressure gradient from one side to the other side of said power stream so as to deflect said power stream, a pair of power stream receiving means for receiving said power stream through an interaction region, and splitter means for dividing said pair of power stream receiving means, characterized by vortex chambers formed on one of the side walls of said interaction region on the side of said control nozzle so as to generate a plurality of vortexes on said one side wall when no control flow is issued from said control nozzle, the leading edge of said splitter means being so tapered that the tapered surface is directed toward the other side wall of said interaction region opposite to the control nozzle, and means on said other side wall for producing a flow for deflecting the power stream toward said one side wall.

2. A pure fluid amplifier as set forth in claim 1 wherein said vortex chamber is disposed in the down stream of said control means with respect to the power stream.

3. A pure fluid amplifier as set forth in claim 1 wherein said pair of power stream receiving means are so arranged that one of said pair of power stream receiving means receives said power stream when said power stream flows in the initial direction, whereas the other power stream receiving means receives said power stream when the said power stream is deflected by said control means.

4. A pure fluid amplifier as set forth in claim 1 wherein the relative position between said vortex chamber and said tapered surface is so determined that the output characteristic of said pure fluid amplifier may be optimized.

5. A pure fluid amplifier as set forth in claim 1 wherein a first projection means is extended from a side wall opposed to a side wall on the side of said control means into said interaction region, and a second projection means is extended from said side wall on the side of said control means into said interaction region thereby separating said vortex chamber from said control means.

6. A pure fluid amplifier as set forth in claim 5 wherein the height and position of said first projection means are determined as in the case of said relative position between said vortex chamber and said tapered surface so that the output characteristics of said pure fluid amplifier may be optimized.

7. A pure fluid amplifier as set forth in claim 5 wherein said side wall from which said first projection means is extended is sufficiently spaced apart from said power stream so that said power stream may not be deflected when said control means is not activated.

8. A pure fluid amplifier comprising main nozzle means for issuing a power stream, a pair of control means disposed in opposite relation with each other in the down stream of said main nozzle means for transversely producing the pressure gradient from one side to the other side of said power stream so as to deflect said power stream, a pair of power stream receiving means for receiving said power stream through an interaction region, and splitter means for dividing said pair of power stream receiving means, characterized by a pair of first vortex chambers formed by enlarging the outlets to said interaction chamber of said pair of control means, a pair of second vortex chambers formed on the side walls of said interaction region in the down stream of said first vortex chambers with respect to the power stream, said first and second vortex chambers on the side of one of said pair of control means from which no control flow is issued generating a plurality of vortices therein, a pair of projection means formed on the side walls of said interaction region so as to separate the second vortex chambers from the first vortex chambers, the leading edge of said splitter means being in the form of a wedge whose tapered surfaces converge toward said interaction region and diverge toward said pair of power stream receiving means, and means on the side walls of the interaction region for producing a flow for deflecting the power stream toward the side wall on which said plurality of vortexes are generated.

9. A pure fluid amplifier as set forth in claim 8 wherein the relative position among said pair of second vortex chambers, said two tapered surfaces of said divider means and said pair of projection means and the height of said pair of projection means are so determined that the output of said bistable fluid amplifier may be optimized.

10. A pure fluid amplifier as set forth in claim 8 wherein the bottoms of said pair of second vertex chambers are made flat.

* * * * *